United States Patent
Dillon

(10) Patent No.: US 6,559,701 B1
(45) Date of Patent: May 6, 2003

(54) METHOD TO REDUCE POWER BUS TRANSIENTS IN SYNCHRONOUS INTEGRATED CIRCUITS

(75) Inventor: Michael N. Dillon, Richfield, MN (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/891,648

(22) Filed: Jun. 26, 2001

(51) Int. Cl.$^7$ ................................................ G06F 1/04
(52) U.S. Cl. ........................................ 327/293; 327/565
(58) Field of Search ............................ 326/33; 327/293, 327/295, 298, 395, 396, 400, 401, 564, 565, 566

(56) References Cited

U.S. PATENT DOCUMENTS 5,528,187 A * 6/1996 Sato et al. .................. 327/141
6,100,734 A * 8/2000 Flora .......................... 327/156
6,288,589 B1 * 9/2001 Potter et al. ................. 327/292

* cited by examiner

*Primary Examiner*—Jeffrey Zweizig
(74) *Attorney, Agent, or Firm*—Trexler, Bushnell, Giangiorgi, Blackstone & Marr Ltd.

(57) ABSTRACT

A method of reducing power rail transients on integrated circuits. The power rail transients are reduced by controlling clock skew in a manner which minimizes dI/dT current demands. The method provides that the phase of the clock to latches/flip flops is shifted in order to spread out the number of simultaneous switching elements. By controlling the number of simultaneous switching devices, a significant reduction in time rate of current demanded from the power rails can be achieved, thereby reducing the magnitude of $V_{SS}/V_{DD}$ voltage transients due to parasitic inductances and resistances supplying power to the integrated circuit. Theoretically, the entire timing spread of the slack graph for clock skew can be used to control the number of simultaneous switching devices.

6 Claims, 5 Drawing Sheets

Clock Balanced to minimize clock skew to each clocked element

Clock skew to each clocked element is Intentionally skewed to minimize dI/dt

METHOD TO REDUCE POWER BUS TRANSIENTS IN SYNCHRONOUS INTEGRATED CIRCUITS

BACKGROUND

This invention generally relates to integrated circuit physical design and power supply integrity, and more specifically relates to a method of reducing power rail transients on integrated circuits.

Approaches which are currently being used to try to reduce power rail transients on integrated circuits include adding more power and ground bonds, and adding on chip capacitance. In effect, these approaches attempt to cure a symptom rather than address the root cause of the problem. Additionally, as voltage levels on newer CMOS (complementary metal oxide semiconductor) technologies continue to decrease, the costs of adding enough of either power and ground bonds or on chip capacitors will increase substantially. As the area needed on die de-coupling capacitors becomes a limiting factor on die size, die cost will increase, and adding additional power bonds and/or adding package power planes will increase package cost.

In a typical integrated circuit, each latch/flip flop is controlled by the edge of a clock feeding a combinational logic path to the next clocked storage device. For power transient analysis, the transient load on each of the flip flops/latches is modelled as a switch controlled by the clock, and the design is synchronous, meaning each switch closes simultaneously. The idea of an ideal synchronous clock has been the basis of most all logic design tools used presently in the industry. While this ideal does simplify the logic design, it also maximizes the differential voltage drop between the $V_{DD}/V_{SS}$ nets due to power supply inductance and resistance. While an asynchronous design would not have as much of a problem, asynchronous design tools and techniques are immature and are not currently widely used in integrated circuit design.

A low cost solution which reduces the need for any of these solutions and which actually addresses the root cause of the problem is needed in the industry.

OBJECTS AND SUMMARY

A general object of an embodiment of the present invention is to provide a method of reducing power rail transients on integrated circuits.

Another object of an embodiment of the present invention is to provide a method of reducing power rail transients on integrated circuits without having to add more power and ground bonds, and reducing the need for added on chip capacitance.

Briefly, and in accordance with at least one of the foregoing objects, an embodiment of the present invention provides a method of reducing power rail transients on integrated circuits by controlling clock skew in a manner which minimizes dI/dT current demands of the integrated circuit. The method provides that the phase of the clock to latches/flip flops is shifted in order to spread out the number of simultaneous switching elements. By controlling the number of simultaneous switching devices, a significant reduction in time rate of current demanded from the power rails can be achieved, thereby reducing the magnitude of $V_{SS}/V_{DD}$ voltage transients due to parasitic inductances and resistances supplying power to the integrated circuit. Theoretically, the entire timing spread of the slack graph for clock skew can be used to control the number of simultaneous switching devices. Ideally, the clock inputs to the storage elements are skewed such that $dI_C/dT$ is minimized while still meeting pre-determined bounding conditions. Preferably, the number of clock buffers and their associated wire is also minimized for all conditions.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DESCRIPTION

Figure 1:
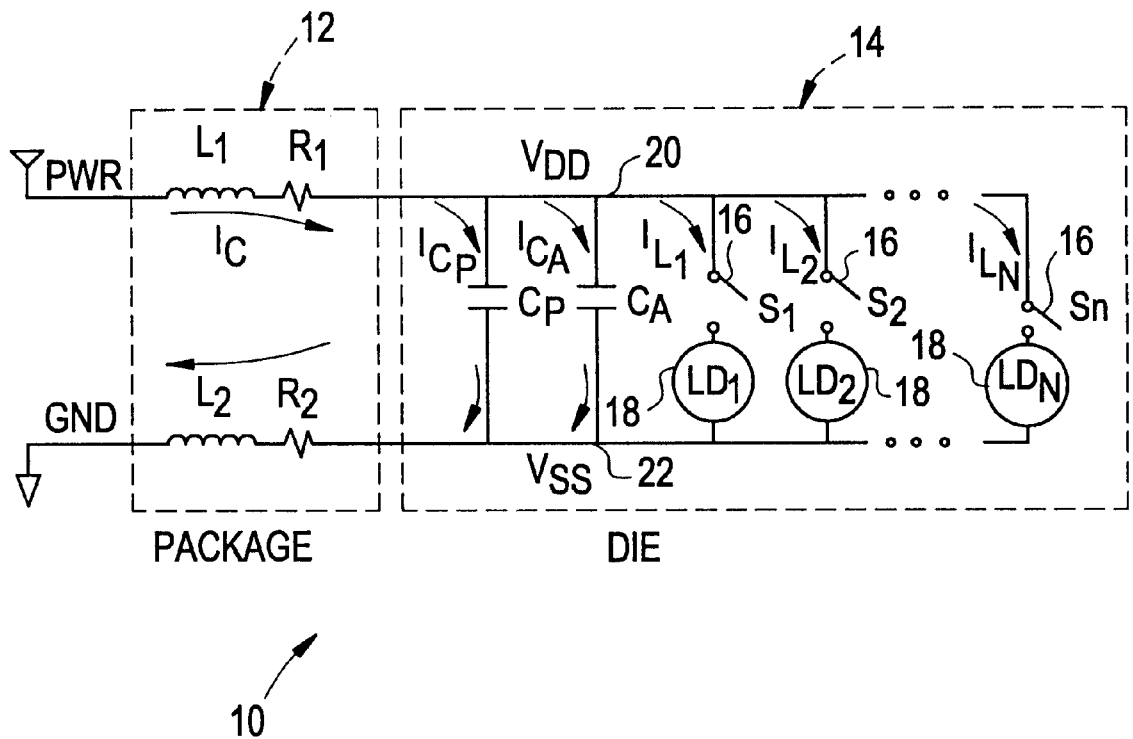
FIG. 1 is a simplified model of a power distribution model for an integrated circuit.

While the invention may be susceptible to embodiment in different forms, there are shown in the drawings, and herein will be described in detail, specific embodiments with the understanding that the present disclosure is to be considered an exemplification of the principles of the invention, and is not intended to limit the invention to that as illustrated and described herein.

An embodiment of the present invention provides a method of reducing power rail transients on integrated circuits. The power rail transients are reduced by controlling clock skew in a manner which minimizes dI/dT current demands. The method provides that the phase of the clock to latches/flip flops is shifted in order to spread out the number of simultaneous switching elements. By controlling the number of simultaneous switching devices, a significant reduction in time rate of current demanded from the power rails can be achieved, thereby reducing the magnitude of $V_{SS}/V_{DD}$ voltage transients due to parasitic inductances and resistances supplying power to the integrated circuit. Theoretically, the entire timing spread of the slack graph for clock skew can be used to control the number of simultaneous switching devices.

FIG. 1 is a simplified diagram of the power distribution network 10 for an integrated circuit 12. In FIG. 1, $C_P$ is parasitic power capacitance (i.e. capacitance associated with power) and $C_A$ is intentionally added capacitance (i.e. for devices which are physically present). $L_1$, $R_1$ and $L_2$, $R_2$ are parasitic package inductance and capacitance, respectively. As shown, the power distribution network 10 provides that an integrated circuit package 12 is connected to a die 14. On the die, switches 16 ($S_1$, $S_2$, . . . $S_n$) and loads 18 ($LD_1$, $LD_2$, . . . $LD_N$) are connected to power rails 20 ($V_{DD}$) and 22 ($V_{SS}$). Each switched load is typically a latch or flip flop that is controlled by the edge (such as the rising edge) of a clock input signal, and each latch or flip flop feeds a combinational logic path to clocked storage devices in the next stage.

Figure 2A:
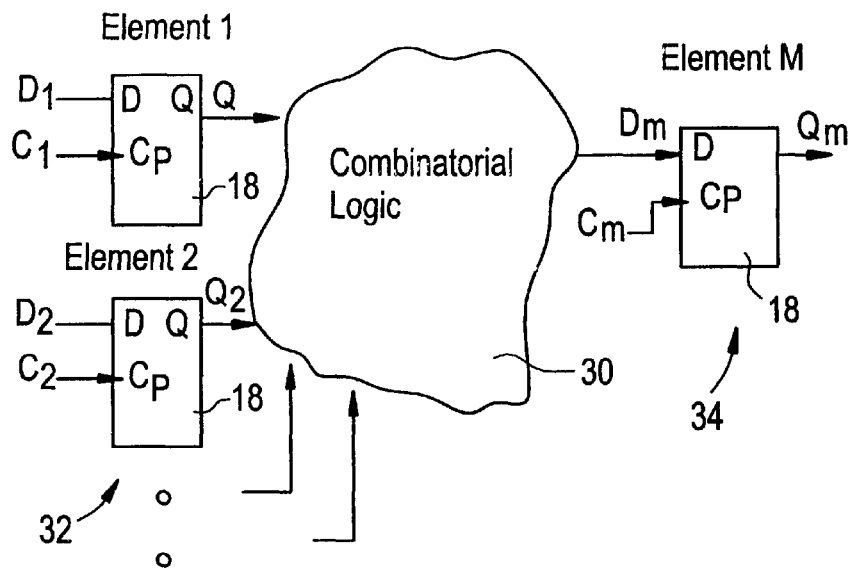
FIG. 2A shows an arrangement of clocked elements on a die.
Figure 2B:
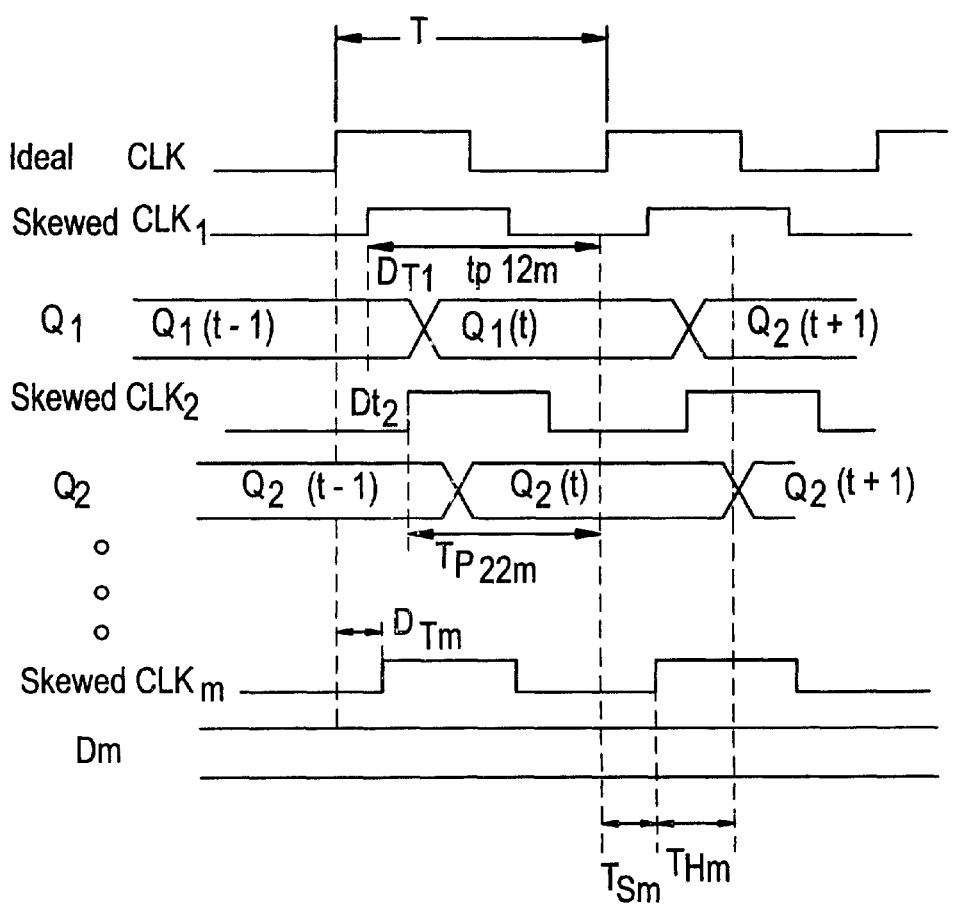
FIG. 2B shows the timing relations of the different clock signals relating to the arrangement shown in FIG. 2A.

The top portion of FIG. 2 shows a typical arrangement of clocked elements 18 on a die, wherein the clocked elements 18 are arranged in stages with combinational logic 30 disposed between the stages. FIG. 2 is representative and illustrates two stages of clocked elements where two clocked elements ("Element 1" and "Element 2") are provided in the first stage 32, and one clocked element ("Element M") is provided in the second, subsequent stage 34. The first two clocked elements receive clock input signals ("$C_1$" and "$C_2$") from a clock tree as well as receive data input signals ("$C_1$" and "$D_2$"). The two clocked elements feed output signals ("$Q_1$" and "$Q_2$") to combinational logic 30 which thereafter feeds a data signal ("$D_M$") to the clocked element which is in the subsequent stage. As shown, the clocked element in the next stage 34 also receives a clock signal input ("$C_M$") from a clock tree, and provides an output signal ("$Q_M$") which may feed combinational logic which leads to a subsequent stage of clocked elements.

With reference to FIG. 1, in a pure synchronous design, the goal in the industry has been to have each switch ($S_1$ through $S_n$) close simultaneously. The idea of an ideal synchronous clock has been the basis of most all logic design tools currently used in the industry. While this ideal does simplify the logic design, it also maximizes the differential voltage drop between the $V_{DD}$ and $V_{SS}$ power rails due to power supply inductance and resistance.

The bottom part of FIG. 2 relates to the top part of FIG. 2, and shows the timing relations of the different clock signals (wherein "Skewed Clk$_1$" corresponds to "$C_1$", "Skewed Clk$_2$" corresponds to "$C_2$", etc.), referenced to an ideal clock. As shown, each clock signal is skewed relative to the ideal clock and relative to the other clock signals feeding that particular stage of clocked elements. By shifting the phase of the clock signal provided to the clocked elements, the number of simultaneous switching elements (i.e. the number of clocked elements which are clocked at any given point in time) are spread out. This reduces the time rate of current demanded from the power rails ($V_{DD}$ and $V_{SS}$), and reduces the magnitude of power rail voltage transients due to parasitic inductances and resistances as a result of supplying power to the integrated circuit 12. By skewing the arrival times of the clock signals which are provided to the clocked elements 18, the time rate of change of activity on the die 14 is minimized and the dI/dT current demands of the integrated circuit 12 is minimized, thereby reducing the peak voltage drop between the power rails 20, 22.

Figure 3:
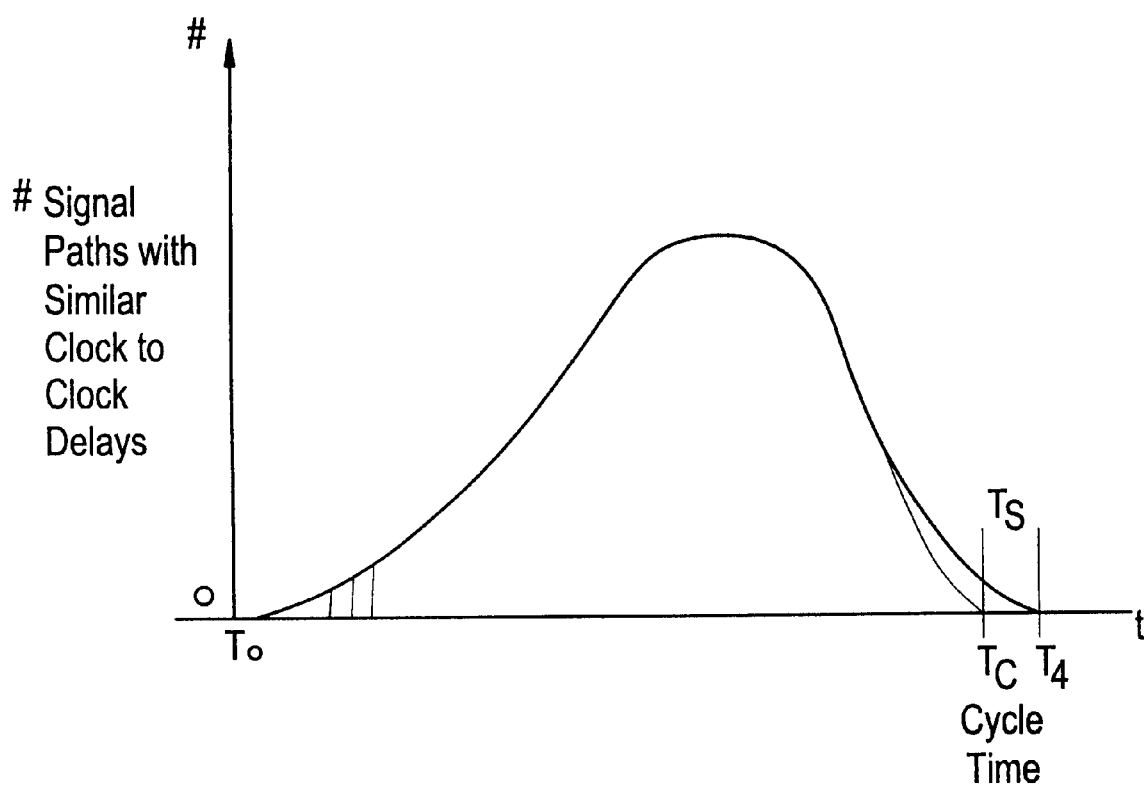
FIG. 3 is a slack graph showing the typical distribution of path delays.

FIG. 3 shows an example of a slack graph, wherein the distribution of path delays is shown. In FIG. 3, the number of signal paths with similar clock to clock delays is graphed against cycle time. The method in accordance with the present invention provides that the entire timing spread of the slack graph (i.e. FIG. 3, from T0 to T4) can be utilized for clock skew. By controlling the number of simultaneous switching devices, there can be a significant reduction in time rate of current demanded from the power rails reducing the magnitude of $V_{SS}/V_{DD}$ voltage transients, due to the parasitic inductances and resistances supplying power to the integrated circuit.

In the ideal case, the clock inputs to the clocked elements are skewed such that dIC/dT (see FIG. 1) is minimized while meeting the bounding conditions set by the following equations:

$$I_C = I_{CP} + I_{CA} + I_{L1} + I_{L2} + \ldots I_{LN}, \quad (1)$$

where N=the number of storage elements; and $$I_{LN} = f(\int DT_n, \int Id_n), \quad (2)$$

where m=0 to # of latches/flip flops.

For any latch/flip flop "X", the minimum and maximum clock skew is limited by the following two equations:

$$DT_x > \max_{n=0}^{n=m} | DT_n + C2QT_n \rightarrow TP_{n2x} + TS_x - T; \text{ and} \quad (3)$$

$$DT_x < \min_{n=0}^{n=m} | DT_n + C2QT_n \rightarrow TP_{n2x} - TH_x, \quad (4)$$

where equation (3) is to satisfy setup conditions on element x, equation (4) is to satisfy hold conditions on element x, C2Qt is the clock to output delay of a source latch/flip flop, m=the number of clocked elements in a clock domain, and $TP_{n2x}$ is the path delay between element "N" and element "X". In the ideal case, the number of clock buffers (and the wire associated with the buffers) used in the clock tree to provide the desired clock skews is minimized for all conditions. There are a number of methods that can be used to search the solution space, such as simulated annealing, or genetic algorithms that can be used to satisfy the hard constraints of setup and hold timing, while minimizing both dIC/dT and clock generation resources.

The clock tree which is used to provide the skewed clock signals to the clocked devices may be similar to the clock trees which are currently used in association with integrated circuits. However, while prior art methods have been directed at minimizing the timing skew between each of the clock inputs of the clocked elements in a design, the method which is in accordance with the present invention attempts to minimize the rate of change in the activity in the design by intentionally skewing the clock arrival times of the switched elements. In the prior art approach, the simultaneous equations—i.e. equations 3 and 4 above—are solved for the single point in the solution space where $DT_n$ is zero or nearly zero for all n (where n is the number of clocked elements in the design). The approach in accordance with the present invention searches that solution space and attempts to minimize the time rate of change of activity on the die, minimizing dI/dT thereby reducing the peak voltage drop.

Figure 4:
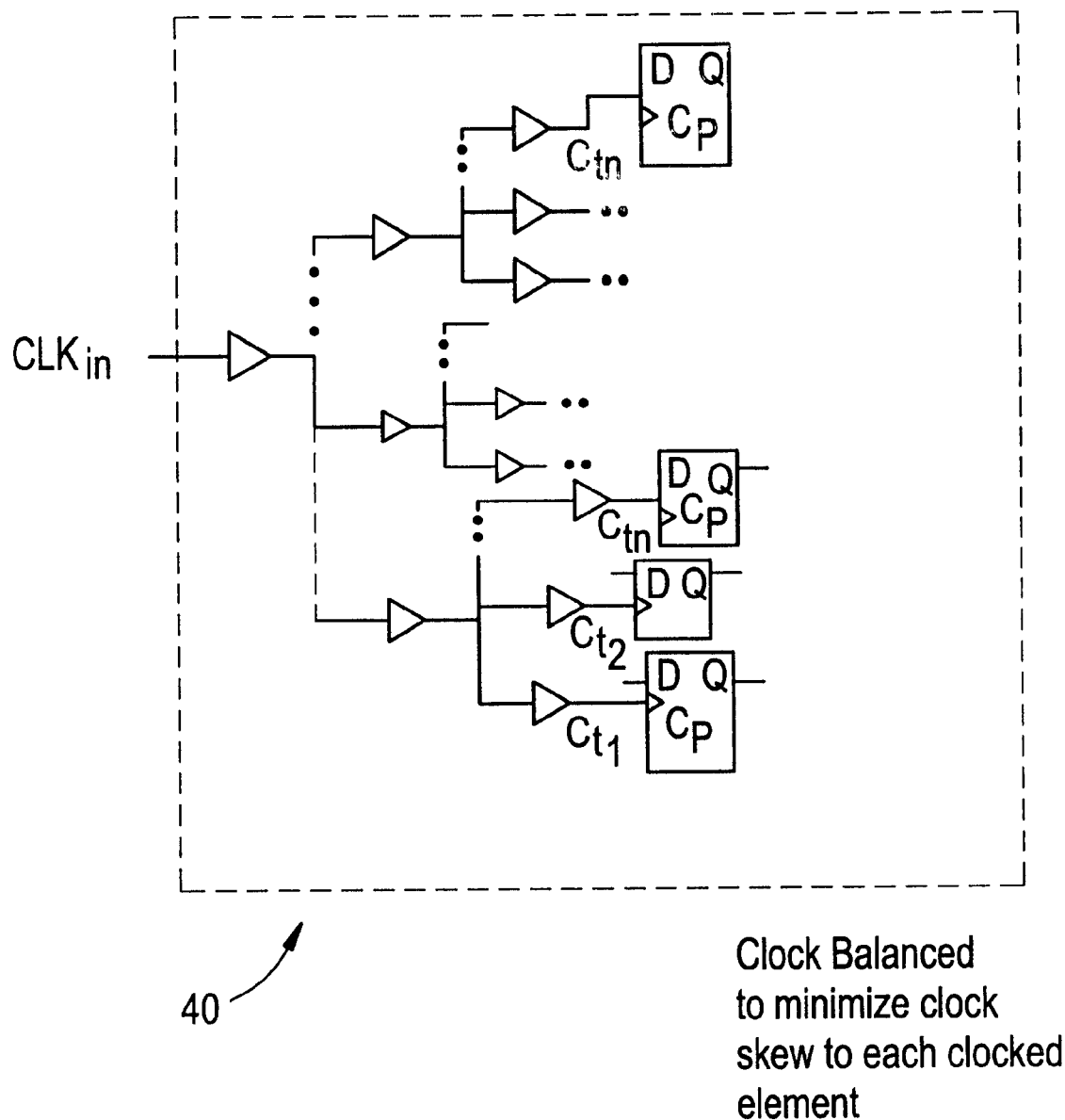
FIG. 4 shows a conventional clock tree designed to minimize the timing skew between each of the clock inputs of the clocked elements in the design.
Figure 5:
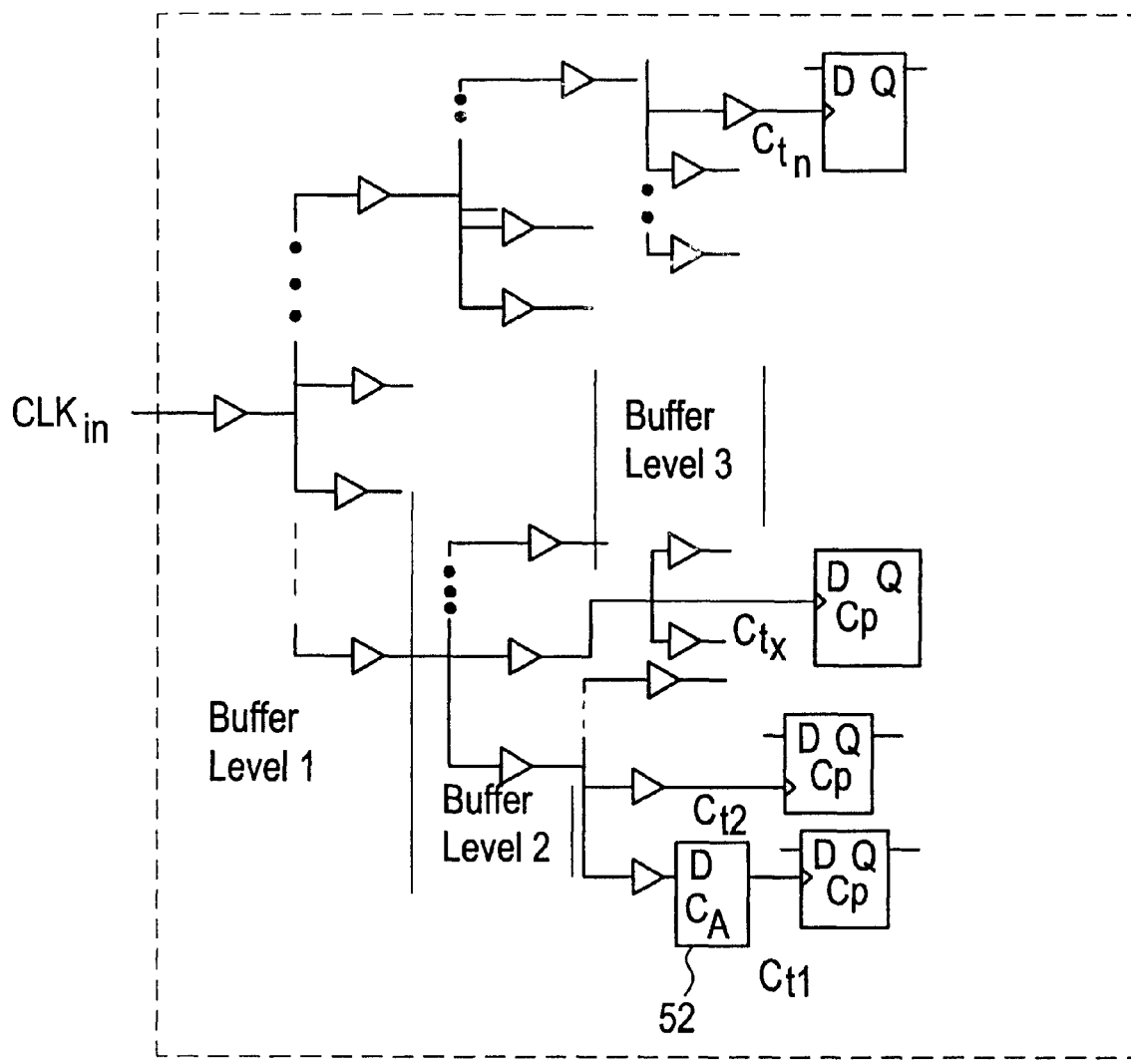
FIG. 5 shows a clock tree which provides that the clock arrival times of the switched elements is intentionally skewed.

Skewing the clock arrival times can be achieved in a number of ways. Many of the same techniques which have been used to balance a conventional clock tree can be used to introduce the desired clock skew. Some of the ways in which the desired clock arrival times can be achieved include: using delay cells in the clock tree, level shifting (i.e. moving a clocked element up or down in the clock tree from where it would normally be), locally adjusting the drive strength of the buffer cells in the clock tree, or introducing additional metal to slow some parts of the tree. FIG. 4 illustrates a conventional clock tree 40 which is designed to minimize the timing skew between the clock signals ($C_{t1}$, $C_{t2}$, $C_{t3}$ ... $C_{tm}$). In contrast, FIG. 5 illustrates an example of a clock tree 50 where the timing skew between the clock signals ($C_{t1}$, $C_{t2}$, $C_{t3}$ ... $C_{tm}$) is intentionally skewed. As shown in FIG. 5, this can be done by using delay elements 52 (as shown for $C_{t1}$), by skipping buffer levels (as shown for $C_{tx}$), by adjusting the buffer drive strengths, or by adding metal (wire) loading to the clock tree at select locations in the clock tree.

By skewing the arrival times of the clock signals which are provided to the clocked elements, dI/dT current demands and power rail transients on integrated circuits can be reduced. By controlling the number of simultaneous switching devices, a significant reduction in time rate of current demanded from the power rails can be achieved, thereby reducing the magnitude of $V_{SS}/V_{DD}$ voltage transients due to parasitic inductances and resistances supplying power to the integrated circuit. Theoretically, the entire timing spread of the slack graph for clock skew can be used to control the number of simultaneous switching devices. Skewing the arrival times of the clock signals allows cheaper packages to be used because fewer pins are needed for the power supply and there is less of a need for power planes in the package. Additionally, wire bond packages can be able to be employed in cases where flip chip arrangements would otherwise have to be employed. Furthermore, skewing the clock signals may result in reduced die sizes in some cases, such as in cases where the required on die capacitance is the die size limiting factor.

While embodiments of the present invention are shown and described, it is envisioned that those skilled in the art may devise various modifications of the present invention without departing from the spirit and scope of the appended claims.

What is claimed is:

1. A method of reducing power rail transients on an integrated circuit which is connected to a die, wherein the die has a plurality of clocked elements which are connected to power rails and which receive clock signal inputs, said method comprising:

minimizing a time rate of change of activity on the die by skewing arrival times of the clock signals which are provided to the clocked elements;

minimizing dI/dT current demands of the integrated circuit by skewing arrival times of the clock signals which are provided to the clocked elements; and reducing a peak voltage drop between the power rails by skewing arrival times of the clock signals which are provided to the clocked elements.

2. The method as recited in claim 1, wherein the clocked elements on the die include at least one of latches and/or flip flops, and said method further comprises shifting the phase of the clock signal provided to the clocked elements, thereby spreading out the number of simultaneous switching elements.

3. The method as recited in claim 2, further comprising reducing a time rate of current demanded from the power rails.

4. The method as recited in claim 3, further comprising reducing the magnitude of power rail voltage transients due to parasitic inductances and resistances as a result of supplying power to the integrated circuit.

5. The method as recited in claim 1, further comprising using substantially an entire timing spread of a slack graph for clock skew in order to control the number of simultaneous switching devices in order to reduce power rail transients on the integrated circuit.

6. The method as recited in claim 1, the step of skewing the arrival times of the clock signals includes at least one of:

providing delay cells on the die connected to the clocked elements;

moving a clocked element on the die from its normal location on the die;

adjusting a drive strength of clock tree buffer cells which are connected to the clocked elements on the die;

providing additional metal in a clock tree which is connected to the clocked elements on the die.

* * * * *